(No Model.)
G. D. COLEMAN.
ELECTRODE FOR SECONDARY BATTERIES.
No. 495,107. Patented Apr. 11, 1893.
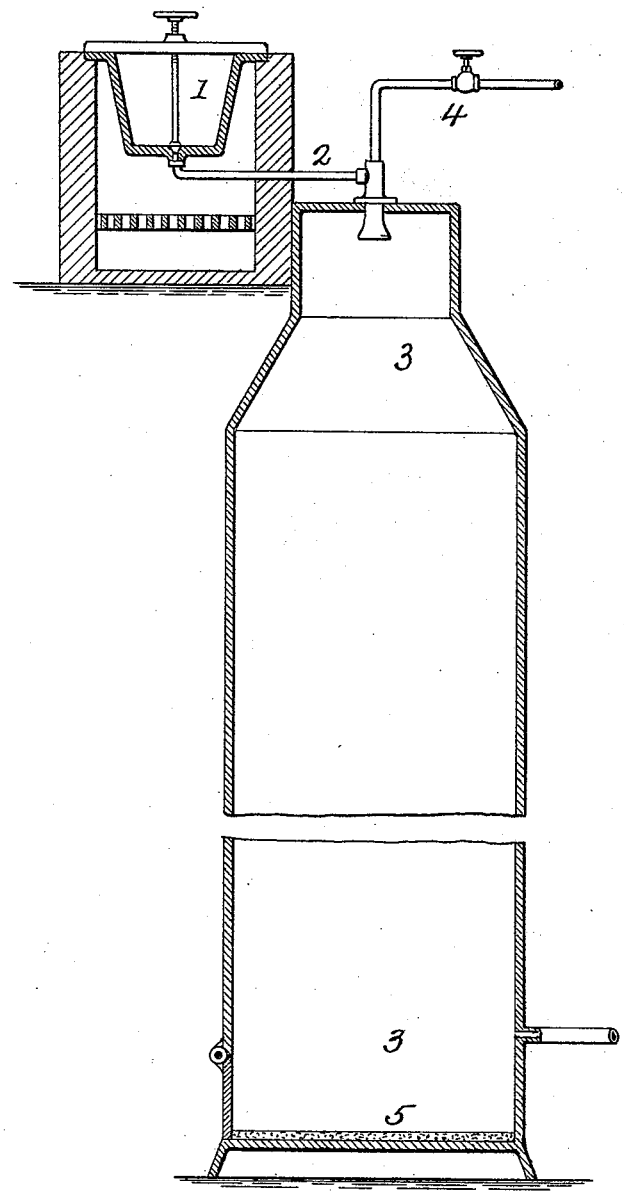
ATTEST:
Geo. H. Arthur
Craig R. Guerin
INVENTOR:
George D. Coleman,
by Robert Burns
Attorney.

UNITED STATES PATENT OFFICE.

GEORGE D. COLEMAN, OF CHICAGO, ILLINOIS, ASSIGNOR OF NINE-TWENTIETHS TO CRAIG R. GUERIN, OF SAME PLACE.

ELECTRODE FOR SECONDARY BATTERIES.

SPECIFICATION forming part of Letters Patent No. 495,107, dated April 11, 1893.

Application filed June 10, 1892. Serial No. 436,262. (No model.)

*To all whom it may concern:*

Be it known that I, GEORGE D. COLEMAN, a citizen of the United States, residing at Chicago, in the county of Cook and State of Illinois, have invented certain new and useful Improvements in Methods of Making Electrodes for Secondary Batteries; and I do hereby declare the following to be a full, clear, and exact description of the same, reference being had to the accompanying drawing, forming part of this specification.

This invention relates to the manufacture of the porous supports for the active material of electrodes for secondary or storage batteries, and the object of the present improvement is to provide a simple and effective method of making such electrode supports in a rapid and cheap manner, and by which an electrode is formed having a very extended active surface, and consequent high efficiency.

To this end my present invention consists broadly in the formation of such supports or grids, by blowing or showering finely divided molten lead, or other analogous metal or material within a closed housing, into a suitable mold, the relative distances of the blowing or showering devices and the receiving mold being such that the finely divided and molten particles of metal, will reach the mold, as they are attaining their point of congelation, so that the particles will merely weld together at their points of contact, only, so as to form a coherent mass or body of great porosity.

In the accompanying drawing I illustrate an apparatus adapted to carry out my present process, which drawing represents a skeleton section of a vertical type of apparatus, designed to practically carry on my present improved method of making porous supports for secondary battery electrodes.

Referring to the drawing, 1, represents the melting pot or tank for the metallic lead, or other metal, intended to form the body of the support; 2, an outlet from such tank adapted to discharge into the chamber or housing 3; and 4, is a jet pipe connected to a suitable source of compressed air or like gas under pressure, such jet pipe 4 being adapted to intersect the lead outlet 2, so as to blow the molten lead in a finely divided or comminuted condition through the housing or chamber 3, which is of sufficient length to admit of the lead particles losing the greater portion of their heat before they drop into the mold or receiver 5, in which they are received, and in which they fuse or weld together at their points of contact into a porous metallic body that can be sawed, cut or otherwise worked into plates of the desired size and form.

I have found by practical experiment that supports of any desired density, porosity, &c., can be formed by the present method, by the relative regulation of the temperature of the molten bath of metal, and the degree of pressure of the blowing jet discharging through the jet pipe 4. The electrode supports for secondary batteries so formed are filled with the active material or coating of lead oxides in any usual manner, so as to form the completed electrode, preferably in the manner set forth in my companion application for Letters Patent Serial No. 436,264.

In my companion application Serial No. 436,263 I have described and claimed the process or method of blowing or showering molten lead, &c., through an atmosphere of carbonic acid gas into suitable molds to form porous supports or grids for secondary battery electrodes. I therefore make no claim in this application to such process as a whole.

Having thus fully described my said invention, what I claim, and desire to secure by Letters Patent, is—

The method of producing a support for a secondary battery electrode, which consists in blowing or showering the finely divided molten metal through a closed chamber or housing and receiving the same when near the point of congelation, in a suitable mold, substantially as set forth.

In testimony whereof witness my hand this 31st day of May, A. D. 1892.

GEORGE D. COLEMAN.

In presence of—
CRAIG R. GUERIN,
ROBERT BURNS.